V. ZDZIARSKI.
RUNNING GEAR FOR VEHICLES.
APPLICATION FILED JULY 3, 1908.
899,780.
Patented Sept. 29. 1908.
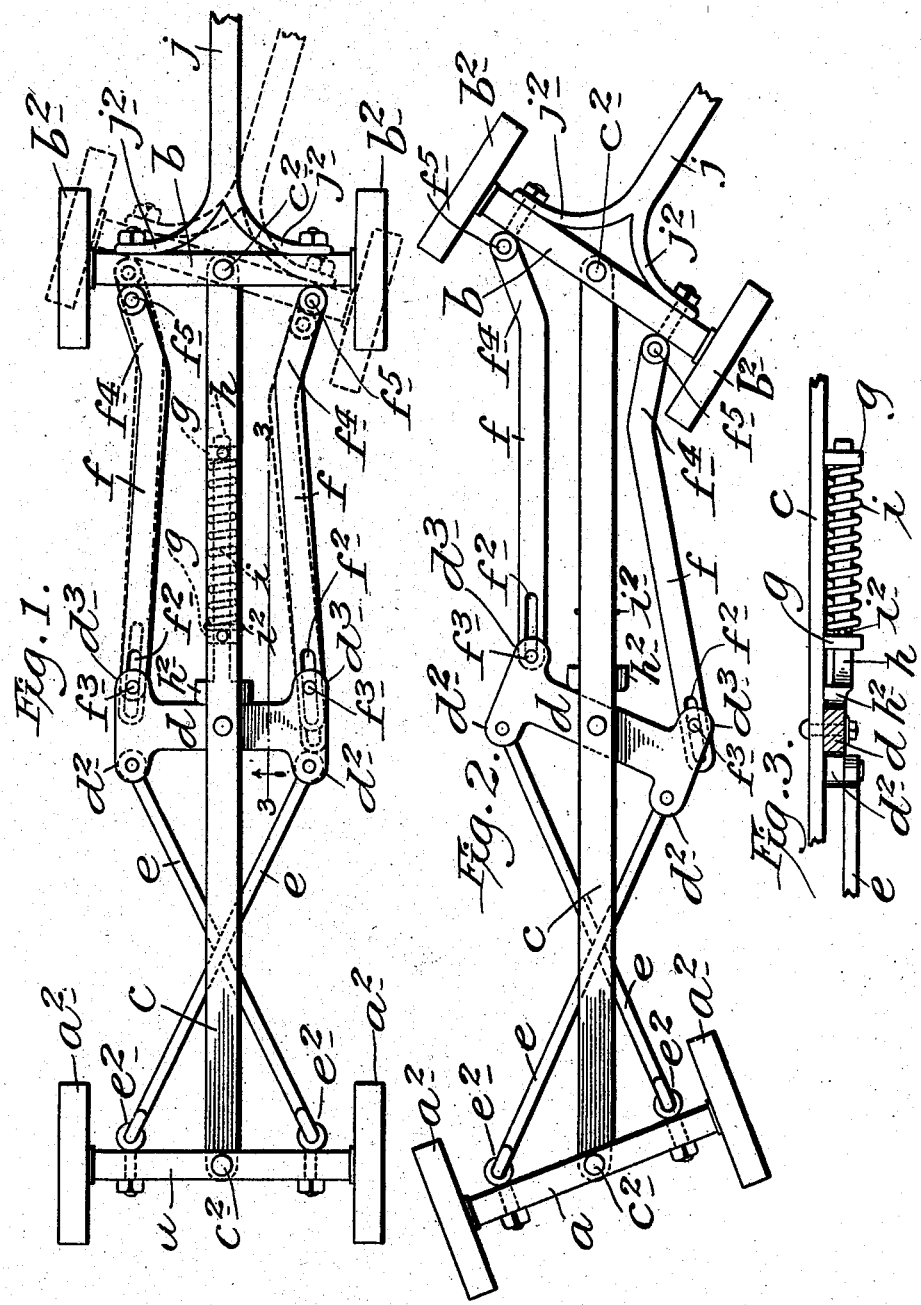
WITNESSES
INVENTOR
Victor Zdziarski.
BY
ATTORNEYS

UNITED STATES PATENT OFFICE.

VICTOR ZDZIARSKI, OF NEW YORK, N. Y.

RUNNING-GEAR FOR VEHICLES.

No. 899,780.

Specification of Letters Patent.

Patented Sept. 29, 1908.

Application filed July 3, 1908. Serial No. 441,752.

*To all whom it may concern:*

Be it known that I, VICTOR ZDZIARSKI, a subject of the Czar of Russia, and residing at New York, in the county of New York and State of New York, have invented certain new and useful Improvements in Running-Gears for Vehicles, of which the following is a specification, such as will enable those skilled in the art to which it appertains to make and use the same.

This invention relates to the running gear of vehicles, and the object thereof is to provide an improvement in this class of devices by means of which a vehicle may be easily guided, and quickly and easily turned in less space than is usually necessary; a further object being to provide a running gear of this class which may be applied to ordinary wagon trucks and to the trucks of light cars.

The invention is fully disclosed in the following specification, of which the accompanying drawing forms a part, in which the separate parts of my improvement are designated by suitable reference characters in each of the views, and in which;—

Figure 1 is a plan view of a wagon truck provided with my improvement and indicating in dotted lines the method of turning the front axle into the guide of the vehicle, Fig. 2 a view similar to Fig. 1 but showing the parts in a different position as when making a short turn, and;— Fig. 3 a partial section on the line 3—3 of Fig. 1.

In the drawing forming part of this specification, I have shown a truck comprising a rear axle $a$ and a front axle $b$, said axles being connected by a horizontal coupling bar $c$ pivoted to the axles $a$ and $b$ at $c^2$, and the axles $a$ and $b$ are provided respectively with wheels $a^2$ and $b^2$.

Pivoted transversely of the bottom of the bar $c$ and approximately centrally thereof is a cross head $d$ provided at its opposite ends with projecting ears $d^2$ and $d^3$, and pivoted to the rearwardly directed ears $d^2$ are link bars $e$ which are crossed centrally and beneath the bar $c$ and pivotally connected with the opposite end portions of the rear axle $a$ as shown at $e^2$, this connection being made, in the construction shown, by eye-bolts passed through the axle $a$, but said connection may be made in any desired manner. Connected with the forwardly directed ears $d^3$ of the cross head $d$ are bars $f$, the rear ends of which are provided with longitudinal slots $f^2$ of predetermined length, and pivot pins $f^3$ are passed through the ears $d^3$ and through the slots $f^2$.

The forward end portions of the bars $f$ are preferably curved outwardly as shown at $f^4$ and are pivotally connected with the front axle $b$ at $f^5$, this connection being made, in the construction shown, by eye-bolts passed through said axle, but this connection also, as will be understood, may be made in any desired manner.

The bottom of the bar $c$ is provided forwardly of the cross head $d$ with keepers $g$ in which is mounted a slide bar $h$ provided with a transverse head $h^2$ which bears on the cross head $d$, and mounted on the slide bar $h$ between the keepers $g$ is a strong spiral spring $i$, the rear end portion of which bears on a stop $i^2$ with which the bar $h$ is provided, and the function of the spring $i^2$ is to force the bar $h$ backwardly so that the head $h^2$ thereof will bear on the cross head $d$ and normally hold it in transverse position as shown in Fig. 1. I have also shown, in the accompanying drawing, a tongue $j$ provided with side arms $j^2$ rigidly connected with the front axle $a$, this connection being made, in the construction shown, by means of the eye-bolts $f^5$, but this connection also may be made in any desired manner.

The normal position of the parts is that shown in Fig. 1, and if at any time it is desired to turn the vehicle in guiding the same, this operation is accomplished by means of the tongue $j$ by which the front axle may be thrown into the position shown in dotted lines in Fig. 1, the bars $f$ also assuming the position shown in said figure. If at any time it becomes necessary to turn the vehicle around or make a more abrupt turn for any purpose the tongue $j$ and front axle may be turned still further as shown in full lines in Fig. 2, and this operation will throw the rear axle into the position also shown in Fig. 2, the bars $f$, the cross head $d$ and the link bars $e$ also assuming the position shown in said figure, and if it is desired to turn in the opposite direction the front and rear axles will assume a position opposite to that shown in Fig. 2, the other movable parts correspondingly changing their position.

The slide bar $h$ normally serves, at all times, to hold the parts in the position shown in full lines in Fig. 1, and assists in returning the parts to said position when thrown out thereof as shown in full lines in Fig. 2.

My improved running gear is simple in construction and operation, and may be made of any desired strength and, as will be understood, may be applied to any kind or class of vehicles whenever the same is desired.

Having fully described my invention, what I claim as new and desire to secure by Letters Patent, is;—

1. A running gear for vehicles comprising front and rear axles, a coupling bar pivotally connected with said axles, a cross head pivoted to the central bottom portion of the coupling bar, link bars pivoted to the opposite end portions of said cross head and crossed beneath said coupling bar and pivoted to the opposite end portions of the rear axle, other bars pivoted to the opposite end portions of the front axle and the rear end portions of which are provided with slots, and pivot pins passed through the opposite end portions of said cross head and through said slots.

2. A running gear for vehicles comprising front and rear axles, a coupling bar pivotally connected with said axles, a cross head pivoted to the central bottom portion of the coupling bar, link bars pivoted to the opposite end portions of said cross head and crossed beneath said coupling bar and pivoted to the opposite end portions of the rear axle, other bars pivoted to the opposite end portions of the front axle and the rear end portions of which are provided with slots, and pivot pins passed through the opposite end portions of said cross head and through said slots, the coupling bar being also provided in front of said cross head with a spring operated slide bar having a transverse head adapted to bear on said cross head.

In testimony that I claim the foregoing as my invention I have signed my name in presence of the subscribing witnesses this 1st day of July, 1908.

VICTOR ZDZIARSKI.

Witnesses:
A. R. APPLEMAN,
M. E. DOODY.